United States Patent Office 2,962,654
Patented Nov. 29, 1960

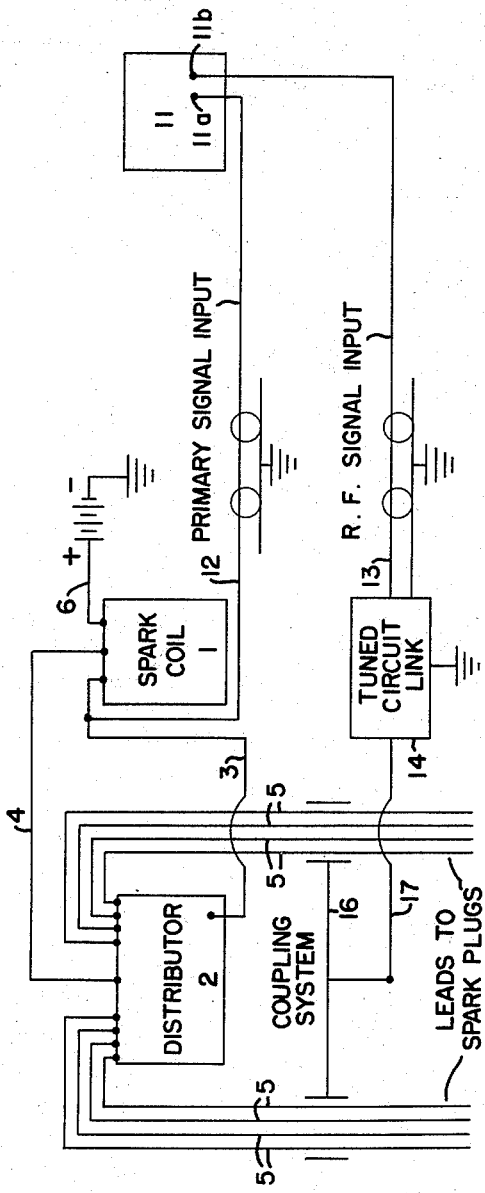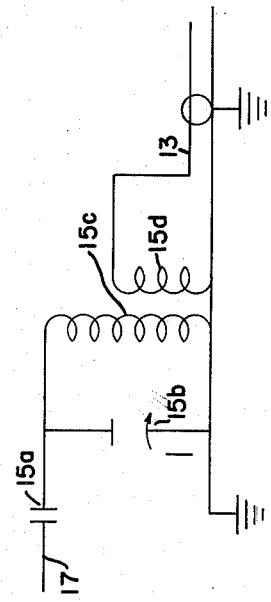
FIG.-1
FIG.-2
James A. Wilson  Inventor

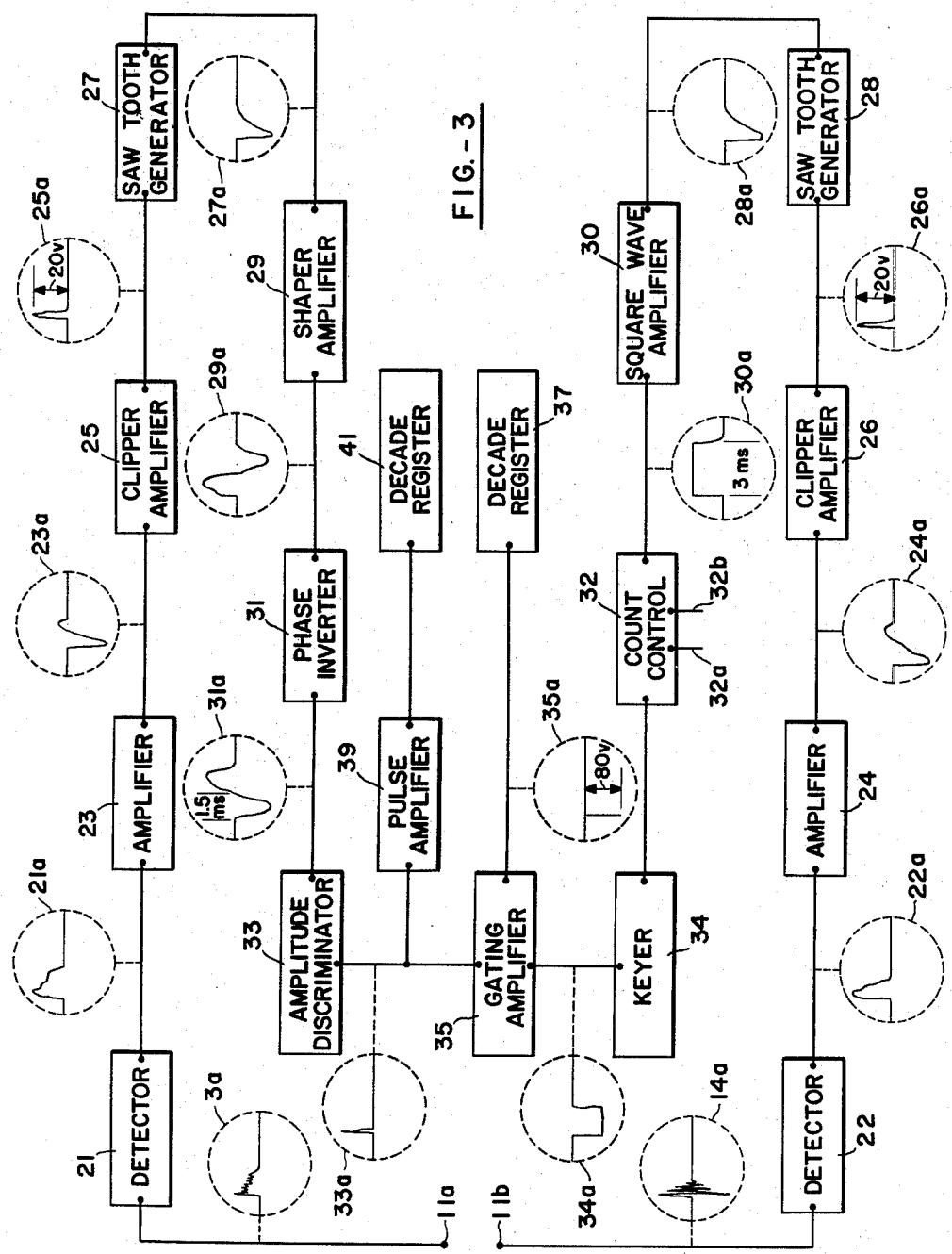

2,962,654

METHOD AND APPARATUS FOR ANALYZING OPERATION OF SPARK-IGNITION ENGINES

James A. Wilson, Stanhope, N.J., assignor to Esso Research and Engineering Company, a corporation of Delaware Filed July 19, 1957, Ser. No. 672,992

7 Claims. (Cl. 324—15)

The present invention relates to a method and an apparatus for analyzing the operational characteristics of a spark discharge means. More particularly, the invention relates to a method and apparatus adapted for analyzing such characteristics of such means operating in a spark-ignition internal combustion engine through an electrical comparison of the number of firing opportunities for one or more engine cylinders with the number of effective spark discharge incidents during any given period of operation. Specifically, the invention relates to a spark plug misfire counter and its method of employment and operation.

In spark-ignition, internal combustion engines, it is important to be able to determine the operating characteristics of the ignition system, and particularly the functioning characteristics of the spark-discharge means employed. Further, it is desirable to have a method and means for determining the effects of various fuel and lubricant compositions on the firing characteristics of the spark discharge ignition means. By the means and method according to the present invention, it has been found possible to analyze and determine the operating characteristics of a spark ignition internal combustion engine, not only under laboratory conditions but under actual road conditions as well.

It is an object of the present invention to provide a method and means for analyzing the function and character of spark discharge in an internal combustion engine. It is also an object of the invention to provide a method and means for accurately determining the number of misfire incidents for any or all engine spark plugs under various operating conditions.

The invention and its objects may be more fully understood from the following description when it is read in conjunction with the accompanying drawings in which:

Fig. 1 is a diagrammatic showing of the apparatus according to the invention, and including the relationship thereof to the conventional ignition circuit of a spark ignition internal combustion engine;

Fig. 2 is a diagrammatic showing of the tuning circuit included in the showing of Fig. 1;

Fig. 3 is a block diagram of the electrical and electronic components of the apparatus represented by Fig. 1, including representative indication of the functions performed by each of these components.

In the diagrammatic showing of the apparatus provided by Fig. 1, the numeral 1 designates the ignition coil of a spark-ignition, internal combustion engine, connected to the distributor 2 of such engine by primary and high tension leads 3 and 4 respectively. The distributor represented, is shown as provided for connection in the ignition system of an eight cylinder engine, with conductors 5 provided for individual connection to a spark plug for each cylinder. The numeral 6 designates the connection of the ignition coil to the car battery.

The apparatus, including a misfire counting system, according to the present invention is represented in Fig. 1, by the block designated by the numeral 11. This apparatus is connected in an engine ignition circuit as by means of a pair of coaxial, shielded wire connections 12 and 13, of which 12 is connected to the ignition coil primary connection 3 through a coupling system (not shown) which system includes an isolation resistor, while 13 is similarly connected to a tuned circuit, unit 14; and thence to a capacitative coupling system 16 for detecting the radio frequency signal produced by the spark discharge of any one of the engine spark plugs. This tuned circuit is shown in greater detail in Fig. 2, and includes a fixed condenser 15a, a variable condenser 15b, a tuning coil 15c, and a link coupling coil 15d. In the system as shown, the tuned circuit consists of a Barker and Williamson Miniductor No. 3016. The tuning condenser is connected across the inductor. Twelve turns of insulated wire are wound over this inductance to form the output link coupling section of the unit. The entire unit is housed in a shielded metal chassis and is provided with a shielded metal cover. The output link coupling coil is connected to the connector 13, while the input side of the unit connects with the coupling system 16 by a short length of connector wire 17. Both, tuning unit and coaxial cable are grounded, substantially as shown, as is also the primary connection 12. The wire connections 12 and 13 attach to the input terminals 11a and 11b of the counting system 11, substantially as shown.

The block diagram of Fig. 3 is representative of the circuitry and components of the misfire counting system according to the present invention representatively shown in Fig. 1, and therein designated by the numeral 11. In such system, two principal circuits are provided. The first such circuit is connected to the terminal 11a, and thus is adapted to be energized by electrical impulses produced in the primary lead 3 by the breaker-point action of the distributor 2. The second circuit is connected to the terminal 11b, and is adapted to be energized by radio-frequency signals emitted by a spark discharge in any cylinder of the engine with which the system is operatively associated. For the purpose of definition and distinction, the circuit and its components connected to the terminal 11a may be designated as the "counting circuit," while that connected to the terminal 11b may be designated as the "interrupting circuit." In each circuit, the signals produced by each component have been represented graphically in a circular enclosure attached to conductor lines connecting components, and designated by a lettered numeral wherein the number corresponds to that of the component source of the signal.

In the counting circuit, the numeral 21 designates a detector. When the breaker points of the distributor 2 open, a voltage pulse is produced in the ignition coil primary lead 3, and a sharp rise in voltage occurs across the points. This sharp rise in voltage passes into the counting circuit as an oscillatory pulse or signal 3a. This oscillatory pulse is rectified and filtered by the detector 21 to produce a positive pulse 21a which is coupled to the grid of a triode amplifier 23. The amplifier 23 produces a somewhat larger negative signal 23a, which is supplied to the positively biased grid of a triode clipper amplifier 25. The output of the amplifier 25 is represented by the signal 25a. This signal is supplied in turn to a saw-tooth generator 27 as a positive pulse which is delivered so as to override the negative bias on the gas filled triode of the saw-tooth generator, to produce a typical saw-tooth voltage output signal of negative polarity designated by the numeral 27a. This output is produced only when the signal 25a is positive. The saw-tooth generator also serves to reject stray or false signals.

The negative output voltage 27a of the saw-tooth generator 27 is coupled to the positively biased grid of a shaper amplifier 29. Here the most negative section of the signal voltage is amplified and differentiated to produce a signal 29a substantially as shown. The signal 29a is a symmetrical signal, as shown, including both positive and negative peaks. In the system illustrated, this signal is then supplied to the phase inverter 31, wherein the input functions of the signal are reversed to produce a signal 31a wherein each initial impulse signal 3a appears now as a symmetrical signal in which the negative portion precedes the positive portion. By suitable adjustment of the circuit constants in the saw-tooth generator and shaper amplifier components of the counting circuit, the cycle time of each signal 29a may be regulated within the limits of the timed intervals between pulses 3a.

Also in the system illustrated, the signal 31a is supplied to the grid of a high speed flip-flop square wave generator, or amplitude discriminator 33. The component 33 is conditioned so as to be responsive only to the positive portion of the cycle of signal 31a, and, therefore, the output signal 33a is delayed one-half cycle from the beginning of signal 31a. It is within the concept of the present invention, however, to provide an amplitude discriminator conditioned to respond only to the negative portion of a signal such as 29a. In this event, the phase inverter 31 may be omitted from the system.

From the amplitude discriminator 33, the positive output signal 33a is transmitted to the input terminal of the gating amplifier 35, where it is coupled to the grid. The gating amplifier is in effect an electronic interrupter switch which is arranged to cut off the signal 33a under certain circumstances to be explained later, but in the absence of such cut-off action, the signal 33a activates the amplifier to produce a signal, such as signal 35a, which is suitable to actuate the decade counter mechanism designated by the numeral 37. Without such cut-off action, each pulse 3a is transmitted through the counting circuit, including the gating amplifier 35 to activate the counter 37. In the absence of such cut-off action the counter mechanism will register each pulse and thereby each spark plug firing opportunity afforded by operation of the distributor 2. In a preferred arrangement, as shown, a separate decade counter 41 is connected in the counting circuit ahead of the gating amplifier 35, and through a signal amplifier 39, in order to provide a means for counting firing opportunities continuously and without regard for cut-off action of the gating amplifier 35.

It has been found that a major component of radio frequency signals emanating from the ignition system of a spark-ignition, internal combustion engine is a function of the firing characteristics of the spark plugs. A minor component is related to the distributor rotor arc. By utilization of a tuned pick-up, the minor component may be minimized, so that the tuned signal output is essentially one resulting from the spark plug function. This is the signal input to the interrupting circuit at 11b. Preferably, the link is tuned to a frequency of from about 1000 to about 1500 kilocycles for best results.

It has also been found that the strength or amplitude of the signal produced by spark discharge at the plugs is affected by the condition of the plugs and also by certain characteristic conditions which may exist in the cylinder in which it is fired. In normal operation signals of substantially constant amplitude may be anticipated at the tuned frequency. A lean fuel-air mixture in the cylinder tends to produce an erratic signal which varies in intensity from cycle to cycle. The detected signal is absent, of course, when the plug fails to arc or discharge, and the signal tends to be reduced or even be non-existent in the presence of an over-rich air fuel mixture, or when the cylinder charge is excessively enriched by the effects of deceleration. Such episodes may be considered equally as misfires.

In the interrupting circuit of Fig. 3, the numeral 14a designates a graphic showing of the signal obtained from the tuned circuit 14 upon effective operation of any spark plug in the ignition system. This signal as in the counting circuit is picked up by a detector 22, rectified and filtered thereby, and emitted as a positive pulse or signal 22a at the output thereof. The signal 22a is coupled to and impressed upon the grid of the triode amplifier 24 and appears as a somewhat larger negative signal 24a at the output thereof. The negative signal 24a is in turn impressed upon the positively biased grid of a clipper amplifier 26 to produce a positive output signal 26a, capable of triggering a saw-tooth signal generator 28, overriding the negatively biased grid of the gas filled triode thereof, whereby to produce a negative signal 28a of typical saw-tooth form.

The signal 28a is in turn impressed upon the positively biased square wave amplifier 30 whereby to produce an output signal 30a. By suitable adjustment of the circuit constants in the saw-tooth generator and square wave amplifier components of the interrupting circuit, the duration of this positive square wave signal may be regulated within the minimum time interval between initial radio frequency signals impressed on the detector 22. Thus each of the counting and interrupting circuits may be regulated so as to conform signals 31a and 30a to substantially the same initiation and duration time by adjustment of the respective components 27 and 29, and 28 and 30 of each. In the signals 31a and 30a, the duration has been shown as adjusted to 3 milliseconds, with the signal 30a constant for that period, and the negative and positive portions of signals 31a each substantially of 1.5 millisecond duration.

From the square wave amplifier 30, the signal 30a is transmitted to a keyer amplifier 34, by way of a switch control mechanism 32. The signal 30a is impressed on the grid of the keyer amplifier component to produce a negative square wave signal 34a. This signal, when transmitted to the gating amplifier 35, is impressed upon the suppressor grid means included therein to over bias this grid and suppress or nullify the effect of the positive phase of the signal 31a transmitted from the phase inverter 31 in the counting circuit. So long as the circuit components have been and are regulated in the manner set forth above, and signals 34a of proper duration are impressed upon the suppressor grid of gating amplifier 35, the signals 31a are interrupted and prevented from activating the decade counter mechanism 37. However, when for any reason, the signals supplied to the detector 22 are interrupted by critical reduction in their intensity, or by failure of a plug to discharge when afforded the opportunity by distributor 2, the signal 34a will not be impressed upon the suppressor grid of gating amplifier 35. Under such condition, the positive phase of the opportunity signal 31a, in the form of signal 33a will be amplified and transmitted as signal 35a whereby to activate the decade counter mechanism 37. Thus the restricted registration of the firing opportunity count serves as a misfire count. In another aspect, the impulse signals from the counting circuit, for activating the counting mechanism may be considered as a positive source of energy similar to that available in a lighting circuit, and wherein the gating amplifier is an off-on switch automatically assuming an on position, but normally maintained in an off position by application of energy from a second source, represented by impulse signals from the interrupting circuit, the counter thus being energized when the second source of energy fails or is interrupted.

The switch control mechanism 32 provides the means whereby power derived through input connections 32a and 32b may be supplied for operation of the system, including the decade counters 37 and 41, and also whereby the interrupting circuit may be disconnected from the gating amplifier 35. Leads from the switch control mechanism to other portions of the system have not been shown, as their inclusion would be superfluous detail. The circuits as well as the decade counters may be operated from any convenient source of power in conventional fashion. The power requirements are for filament voltages, as well as plate, bias and reference voltages normal to any electronic system, including components such as set forth for the respective counting and interrupting circuits. For field operation, power may be supplied from the battery of any automobile with which the system is associated. In the laboratory, an A.C. power source may be employed. For automotive use, the leads 32a and 32b, as well as the lead 13, may be provided for clip connection to the automotive battery and primary connections respectively. The interrupting circuit, of course, must be capacitively coupled to the spark plug wires.

Exemplifying operation of the system according to the invention, the following data obtained from three representative tests are tabulated below:

FIELD DATA

*Spark plug misfire counter*

[Conditions: Level road; full throttle acceleration; 20 to 80 m.p.h.; 8 cylinder engines]

| | Speed Interval, m.p.h. | Cumulative Count | | Speed Interval Count | | Misfire Evaluation Percent |
|---|---|---|---|---|---|---|
| | | Misfire | Total | Misfire | Total | |
| Test A— New Plugs. | 20-30 | 0 | 260 | 0 | 260 | 0 |
| | 30-40 | 0 | 700 | 0 | 440 | 0 |
| | 40-50 | 0 | 1,250 | 0 | 550 | 0 |
| | 50-60 | 1 | 2,100 | 1 | 850 | 0.1 |
| | 60-70 | 3 | 3,250 | 2 | 1,150 | 0.2 |
| | 70-80 | 9 | 5,450 | 6 | 2,200 | 0.3 |
| Test B— Used Plugs. | 20-30 | 0 | 260 | 0 | 260 | 0 |
| | 30-40 | 0 | 700 | 0 | 440 | 0 |
| | 40-50 | 3 | 1,250 | 3 | 550 | 0.5 |
| | 50-60 | 10 | 2,100 | 7 | 850 | 0.8 |
| | 60-70 | 27 | 3,600 | 17 | 1,500 | 1.1 |
| | 70-80 | 115 | 6,120 | 88 | 2,520 | 3.5 |
| Test C— Fouled Plugs. | 20-30 | 10 | 270 | 10 | 270 | 3.7 |
| | 30-40 | 60 | 760 | 50 | 490 | 10.2 |
| | 40-50 | 150 | 1,350 | 90 | 590 | 15.2 |
| | 50-60 | 240 | 2,400 | 90 | 1,050 | 8.6 |
| | 60-70 | 560 | 4,100 | 320 | 1,700 | 18.8 |
| | 70-80 | 1,880 | 7,180 | 1,320 | 3,080 | 43.0 |

In these tests, a separate discharge opportunity counter, such as the counter 41 of Fig. 3, was not employed. In each test, duplicate runs were made for the data reported. On the first run, the switch control 32 was operated to disconnect the interrupting circuit from the gating amplifier, thus permitting all signal impulses derived from the ignition coil primary 3 to activate the decade counter mechanism. On the second run of each test, the switch control was operated to connect the interrupting circuit to the gating amplifier, thus preventing operation of the decade counter except upon failure of the radio frequency signals derived from spark discharges occurring in the engine being tested. The count thus obtained represented misfires or the equivalent as previously described.

In the above table, the speed intervals or ranges, from which specific data were noted, are shown in the first column for each of the three tests. The total opportunity through each speed range from start to finish is tabulated under the heading "Cumulative Count." Also listed under this heading are the total spark discharge failures or misfires through each speed range.

The figures tabulated under the heading "Speed Interval Count" were derived from the figures reported under the heading "Cumulative Count." This was accomplished for any speed range by subtracting from the total count at that speed range, the total count at the next preceding speed range. Thus the "Speed Interval Count" of both total opportunities and misfires in the 60-70 m.p.h. range is the difference between the "Cumulative Count" in that range and the same count in the 50-60 m.p.h. range. The counts thus derived, were employed to provide an indication in any speed range of the percentage of misfires relative to the total discharge opportunities within that range. In the table, the calculated percentage misfires are reported under the heading "Misfire Evaluation," and to the nearest 0.1 percent.

As may be observed from comparison of the data reported for each of the test runs, the method and apparatus provide an effective tool for determination and comparison of engine operating efficiency. Although the tests in this instance were specifically applied to provide information relative to the effects on engine operation produced by spark plugs having different characteristics of initial physical condition, the effect of different fuels and fuel additives, and also lubricating oils may be determined from the manner, degree and time in which they may affect spark plug operation. In fact, the method and apparatus according to the present invention may be employed advantageously for the evaluation of any condition of engine operation which may affect a change in the intensity or regularity of spark discharge in the engine cylinders.

What is claimed is:

1. In a spark discharge system, including a voltage transformer having primary and secondary circuits, a distributor adapted to produce synchronously pulsed currents in said circuits and to deliver a pulsed, high voltage current induced in said secondary circuit, and a spark discharge means in said secondary circuit adapted to discharge said pulsed high voltage current to ground, and wherein such discharge produces a signal in the radio-frequency range, a method for determining the effective discharge of said current by said spark discharge means which comprises: drawing a pulsed current from said primary circuit as a first pulsed voltage signal, impressing said first signal upon a first transmission circuit, modifying said first signal during transmission by said first circuit to produce a symmetrical cyclic signal having two successive opposite phase components of substantially equal duration and amplitude, suppressing the first phase component of said cyclic signal in said first circuit tuning a second circuit to receive a radio-frequency signal produced in a selected range by spark discharge of said pulsed, high voltage current, converting said radio-frequency signal to a second voltage signal in said second circuit and modifying said second signal in said second circuit to produce a square wave signal having a duration substantially equal to both phases of said cyclic signal and synchronous therewith, impressing each of said first and second modified signals upon a third circuit wherein the second phase component of said modified first signal is suppressed by synchronous occurrence of said modified second signal, and electronically counting any failure of said modified second signal to suppress said modified first signal second phase component as an incident failure of said spark discharge means.

2. A method according to claim 1 in which said second circuit is tuned to receive a signal of a radio-frequency from about 1000 to about 1500 kilocycles.

3. In combination with a system for producing spark discharge of a high tension current, including an induction coil having primary and secondary windings and adapted for induction of a high tension current in said secondary winding, a D.C. current source connected to said primary winding at one end thereof, a spark discharge means, and means separately connected between said secondary winding and spark discharge means, and between the other end of said primary winding and ground which means is adapted to pulse current flow through said induction coil primary winding and synchronously to deliver an induced high tension current pulse to said spark discharge means from said induction coil secondary winding, wherein said pulsed high tension current is discharged to ground with the emission of energy in the radio frequency range, an apparatus for counting failures of said spark discharge means to emit energy in a preselected portion of said radio-frequency range, which comprises a first pulse transmission circuit having an input coupled to said connection between said induction coil primary winding and said current flow pulsing means whereby to impress on said circuit an initial voltage signal for each current flow pulse; component means in said first transmission circuit adapted to produce a modified output voltage signal and to delay transmission of said modified signal for a period not substantially more than one-half the time between each current pulse; a radio receiver tuned to said preselected portion of said radio-frequency range and capacitance coupled to said connection between said current flow pulsing means and said spark discharge means, said receiver being adapted to develop a voltage signal output characteristic of each energy emission incident in said preselected radio frequency range and substantially synchronous with said initial voltage signal impressed upon said first transmission circuit, a second transmission circuit having an input link coupled to said radio receiver to receive therefrom said developed characteristic voltage signal output; component means in said second transmission circuit adapted to modify said characteristic voltage signal to produce an output signal having a duration period substantially equal to twice the signal output period of said first transmission circuit, means for counting individual current pulses adapted for activation by said first transmission circuit output voltage signal; circuit breaker means connected between said first transmission circuit and said pulse counting means, said circuit breaker means being biased to maintain said connection; and means including said second transmission circuit, to impress said modified characteristic voltage signal upon said circuit breaker to overcome the bias thereof, whereby to break said connection between said first transmission circuit and said pulse counting means.

4. An apparatus according to claim 3, wherein said circuit breaker is a gating amplifier responsive to only the second phase portion of a cyclic voltage signal derived from individual current pulses from said current pulsing means.

5. An apparatus according to claim 3, wherein said means for counting individual current pulses is a decade counter mechanism.

6. An apparatus according to claim 3, wherein said first pulse transmission circuit comprises, a detector, an amplifier, a clipper amplifier, a saw tooth wave generator, a shaper amplifier, and an amplitude discriminator.

7. An apparatus according to claim 3, wherein said second pulse transmission circuit, comprises a detector, an amplifier, a clipper amplifier, a saw tooth wave generator, and a square wave generator.

References Cited in the file of this patent

UNITED STATES PATENTS

| | | |
|---|---|---|
| 1,976,988 | Grangier et al. | Oct. 16, 1934 |
| 2,499,410 | Nupp | Mar. 7, 1950 |
| 2,575,087 | Baker | Nov. 13, 1951 |
| 2,591,088 | Millman | Apr. 1, 1952 |
| 2,679,617 | Mullaney | May 25, 1954 |
| 2,789,267 | Beal et al. | Apr. 16, 1957 |